United States Patent
Stephens et al.

(10) Patent No.: US 12,517,681 B2
(45) Date of Patent: Jan. 6, 2026

(54) ANALYTICAL STORAGE SYSTEMS, DEVICES, AND METHODS

(71) Applicant: AirMettle, Inc., Houston, TX (US)

(72) Inventors: Donpaul C. Stephens, Houston, TX (US); Chia Lin Wu, Oakton, VA (US); Rohan Pradeep Puri, State College, PA (US)

(73) Assignee: AirMettle, Inc., Houston, TX (US)

( * ) Notice: Subject to any disclaimer, the term of this patent is extended or adjusted under 35 U.S.C. 154(b) by 0 days.

(21) Appl. No.: 18/603,627

(22) Filed: Mar. 13, 2024

(65) Prior Publication Data

US 2025/0156112 A1 May 15, 2025

Related U.S. Application Data

(60) Provisional application No. 63/617,469, filed on Jan. 4, 2024, provisional application No. 63/598,694, filed on Nov. 14, 2023.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ........ G06F 12/0246; G06F 2212/7201; G06F 3/0608; G06F 3/064; G06F 3/0659; G06F 3/0688

See application file for complete search history.

(56) References Cited

U.S. PATENT DOCUMENTS

2018/0107400 A1\* 4/2018 Tsai ................. G06F 3/064

FOREIGN PATENT DOCUMENTS

WO 1995011487 A1 4/1995

OTHER PUBLICATIONS

Erik Riedel, Active Disks—Remote Execution for Network-Attached Storage, Carnegie Mellon University, School of Computer Science, Pittsburgh PA 15213, CMU-CS-99-177, Nov. 1999, pp. 1-182.

(Continued)

*Primary Examiner* — Yong J Choe
(74) *Attorney, Agent, or Firm* — BainwoodHuang

(57) ABSTRACT

Techniques for providing analytical storage systems and devices capable of executing analytical data operations "near-storage." The techniques include, upon receipt of a first command from a host computer, identifying which data elements within specified address ranges of selected columns of a data array match defined filter criteria. The techniques include providing, to the host computer, a count of the identified data elements, and/or a bitmap containing binary values indicating locations of the identified data elements in the selected columns. The techniques include, upon receipt of a second command from the host computer, providing, to the host computer, the identified data elements from the column locations indicated by the bitmap. The techniques can reduce, in a single pass, amounts of data to be provided to a host computer during execution of analytical data operations "near-storage." The techniques can be implemented in systems and devices with reduced technological complexity and simplified programmability.

18 Claims, 10 Drawing Sheets

(56) References Cited

OTHER PUBLICATIONS

Dina Fakhry, Mohamed Abdelsalam, M. Watheq El-Kharashi, Mona Safar, A review on computational storage devices and near memory computing for high performance applications, Elsevier, Memories—Materials, Devices, Circuits and Systems, Apr. 2023, pp. 1-15.

Asif Ali Khan, João Paulo C. De Lima, Hamid Farzaneh, Jeronimo Castrillon, The Landscape of Compute-near-memory and Compute-in-memory: A Research and Commercial Overview, Jan. 2024, pp. 1-34.

Randall Hunt; "S3 Select and Glacier Select—Retrieving Subsets of Objects," AWS News Blog, Jun. 3, 2023, XP093244115, Retrieved from https://web.archive.org/web/20230603144642/https://aws.amazon.com/blog/aws/s3-glacier-select/, pp. 1-4.

Boncheol Gu, et al.; "Biscuit: a Framework for Near-Data Processing of Big Data Workloads," ACM/IEEE 43rd Annual International Symposium on Computer Architecture, Jun. 1, 2016, XP093244147, Retrieved from http://ieeexplore.ieee.org/stampPDF/getPDF.jsp?tp=&arnumber=7551390&ref=aHR0cHM6Ly9pZWV1eHBsb3J1Lm11ZWUub3JnL2RvY3VtZW50Lzc1NTEzOTA=>, pp. 153-165.

* cited by examiner

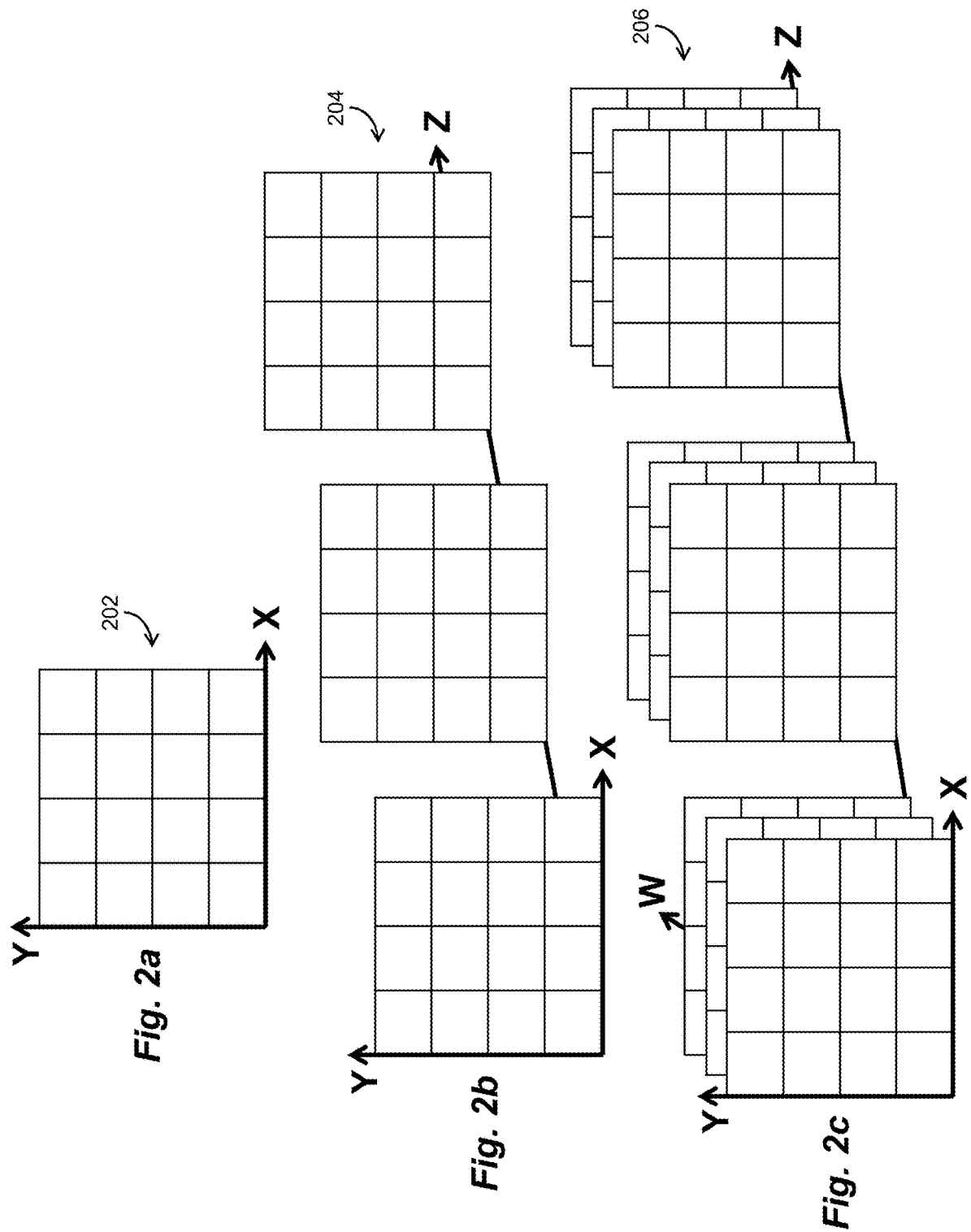

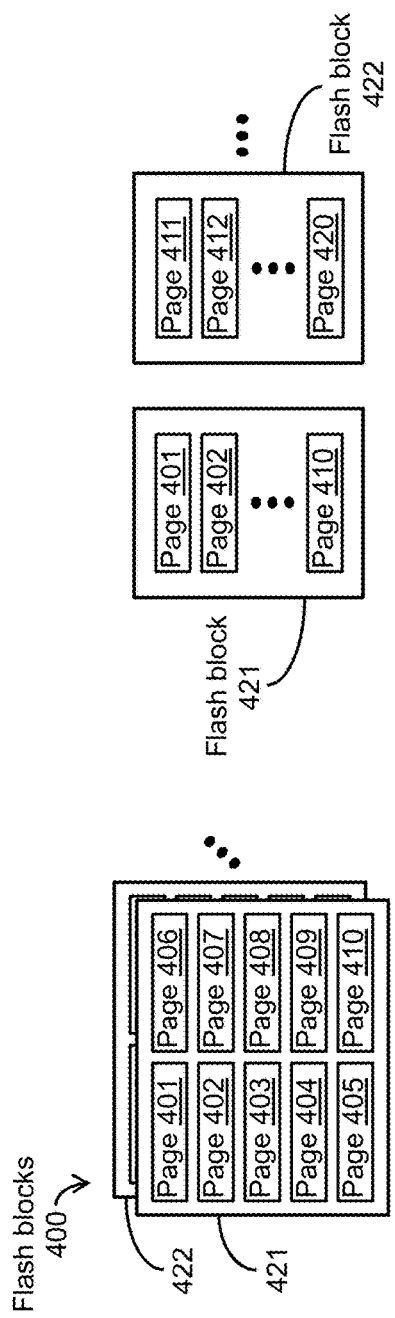
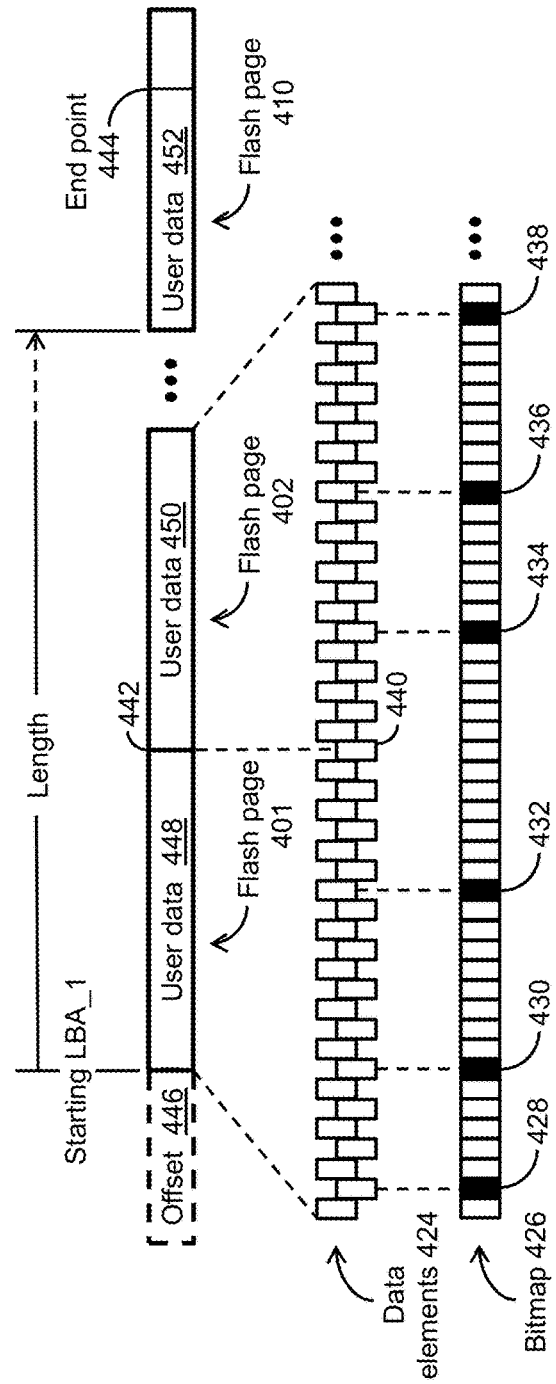
Fig. 4a
Fig. 4b
Fig. 4c

| LINE NUMBER | CUSTOMER KEY 602 | PART KEY 604 | SUPPLY KEY 606 | ORDER DATE 608 | ORDER PRIORITY | QUANTITY 610 | REVENUE 612 | SUPPLY COST 614 | TAX |
|---|---|---|---|---|---|---|---|---|---|
| 5 | 68 | 341 | 349 | 20240101 | 3-MEDIUM | 34 | 9968.63 | 3995.22 | 0.10 |
| 5 | 979 | 510 | 942 | 20240102 | 2-HIGH | 18 | 20748.27 | 3752.25 | 0.05 |
| 7 | 772 | 515 | 283 | 20240103 | 5-LOW | 30 | 37516.42 | 7694.96 | 0.12 |
| 5 | 235 | 70 | 587 | 20240104 | 5-LOW | 13 | 26818.47 | 3488.45 | 0.15 |
| 5 | 717 | 358 | 821 | 20240105 | 5-LOW | 47 | 24896.14 | 6744.53 | 0.05 |
| 4 | 999 | 909 | 434 | 20240106 | 1-URGENT | 33 | 1026.75 | 5414.60 | 0.12 |
| 5 | 292 | 557 | 220 | 20240107 | 1-URGENT | 35 | 21844.68 | 5107.17 | 0.13 |
| 5 | 727 | 886 | 820 | 20240108 | 3-MEDIUM | 24 | 4114.13 | 9061.04 | 0.19 |
| 9 | 702 | 766 | 740 | 20240109 | 1-URGENT | 26 | 11204.41 | 5769.13 | 0.16 |
| 5 | 710 | 323 | 874 | 20240110 | 4-NOT SPECIFIED | 47 | 46687.30 | 8355.19 | 0.17 |
| 4 | 728 | 624 | 787 | 20240111 | 4-NOT SPECIFIED | 44 | 11554.51 | 7392.95 | 0.10 |
| 8 | 556 | 92 | 374 | 20240112 | 5-LOW | 42 | 43058.54 | 866.29 | 0.04 |
| 6 | 33 | 342 | 291 | 20240113 | 2-HIGH | 47 | 40341.78 | 7844.55 | 0.20 |
| 6 | 12 | 424 | 564 | 20240114 | 5-LOW | 1 | 8798.17 | 2560.27 | 0.03 |
| 1 | 617 | 552 | 671 | 20240115 | 4-NOT SPECIFIED | 13 | 30679.89 | 9079.92 | 0.09 |

| LINE NUMBER | CUSTOMER KEY 602 | PART KEY 604 | SUPPLY KEY 606 | ORDER DATE 608 | ORDER PRIORITY | QUANTITY 610 | REVENUE 612 | SUPPLY COST 614 | TAX |
|---|---|---|---|---|---|---|---|---|---|
| 5 | 68 | 341 | 349 | 20240101 | 3-MEDIUM | 34 | 9968.63 | 3995.22 | 0.10 |
| 5 | 979 | 510 | 942 | 20240102 | 2-HIGH | 18 | 20748.27 | 3752.25 | 0.05 |
| 7 | 772 | 515 | 283 | 20240103 | 5-LOW | 30 | 37516.42 | 7694.96 | 0.12 |
| 5 | 235 | 70 | 587 | 20240104 | 5-LOW | 13 | 26818.47 | 3488.45 | 0.15 |
| 5 | 717 | 358 | 821 | 20240105 | 5-LOW | 47 | 24896.14 | 6744.53 | 0.05 |
| 4 | 999 | 909 | 434 | 20240106 | 1-URGENT | 33 | 1026.75 | 5414.60 | 0.12 |
| 5 | 292 | 557 | 220 | 20240107 | 1-URGENT | 35 | 21844.68 | 5107.17 | 0.13 |
| 5 | 727 | 886 | 820 | 20240108 | 3-MEDIUM | 24 | 4114.13 | 9061.04 | 0.19 |
| 9 | 702 | 766 | 740 | 20240109 | 1-URGENT | 26 | 11204.41 | 5769.13 | 0.16 |
| 5 | 710 | 323 | 874 | 20240110 | 4-NOT SPECIFIED | 47 | 46687.30 | 8355.19 | 0.17 |
| 4 | 728 | 624 | 787 | 20240111 | 4-NOT SPECIFIED | 44 | 11554.51 | 7392.95 | 0.10 |
| 8 | 556 | 92 | 374 | 20240112 | 5-LOW | 42 | 43058.54 | 866.29 | 0.04 |
| 6 | 33 | 342 | 291 | 20240113 | 2-HIGH | 47 | 40341.78 | 7844.55 | 0.20 |
| 6 | 12 | 424 | 564 | 20240114 | 5-LOW | 1 | 8798.17 | 2560.27 | 0.03 |
| 1 | 617 | 552 | 671 | 20240115 | 4-NOT SPECIFIED | 13 | 30679.89 | 9079.92 | 0.09 |

*Fig. 6b*

| LINE NUMBER | CUSTOMER KEY 602 | PART KEY 604 | SUPPLY KEY 606 | ORDER DATE 608 | ORDER PRIORITY | QUANTITY 610 | REVENUE 612 | SUPPLY COST 614 | TAX |
|---|---|---|---|---|---|---|---|---|---|
| 5 | 68 | 341 | 349 | 20240101 | 3-MEDIUM | 34 | 9968.63 | 3995.22 | 0.10 |
| 5 | 979 | 510 | 942 | 20240102 | 2-HIGH | 18 | 20748.27 | 3752.25 | 0.05 |
| 7 | 772 | 515 | 283 | 20240103 | 5-LOW | 30 | 37516.42 | 7694.96 | 0.12 |
| 5 | 235 | 70 | 587 | 20240104 | 5-LOW | 13 | 26818.47 | 3488.45 | 0.15 |
| 5 | 717 | 358 | 821 | 20240105 | 5-LOW | 47 | 24896.14 | 6744.53 | 0.05 |
| 4 | 999 | 909 | 434 | 20240106 | 1-URGENT | 33 | 1026.75 | 5414.60 | 0.12 |
| 5 | 292 | 557 | 220 | 20240107 | 1-URGENT | 35 | 21844.68 | 5107.17 | 0.13 |
| 5 | 727 | 886 | 820 | 20240108 | 3-MEDIUM | 24 | 4114.13 | 9061.04 | 0.19 |
| 9 | 702 | 766 | 740 | 20240109 | 1-URGENT | 26 | 11204.41 | 5769.13 | 0.16 |
| 5 | 710 | 323 | 874 | 20240110 | 4-NOT SPECIFIED | 47 | 46687.30 | 8355.19 | 0.17 |
| 4 | 728 | 624 | 787 | 20240111 | 4-NOT SPECIFIED | 44 | 11554.51 | 7392.95 | 0.10 |
| 8 | 556 | 92 | 374 | 20240112 | 5-LOW | 42 | 43058.54 | 866.29 | 0.04 |
| 6 | 33 | 342 | 291 | 20240113 | 2-HIGH | 47 | 40341.78 | 7844.55 | 0.20 |
| 6 | 12 | 424 | 564 | 20240114 | 5-LOW | 1 | 8798.17 | 2560.27 | 0.03 |
| 1 | 617 | 552 | 671 | 20240115 | 4-NOT SPECIFIED | 13 | 30679.89 | 9079.92 | 0.09 |

*Fig. 6c*

| CUSTOMER KEY 602 | ORDER DATE 608 | PART KEY 604 | SUPPLY KEY 606 | REVENUE 612 | SUPPLY COST 614 |
|---|---|---|---|---|---|
| 979 | 20240102 | 510 | 942 | 20748.27 | 3752.25 |
| 235 | 20240104 | 70 | 587 | 26818.47 | 3488.45 |
| 617 | 20240115 | 552 | 671 | 30679.89 | 9079.92 |

*Fig. 6d*

ANALYTICAL STORAGE SYSTEMS, DEVICES, AND METHODS

CROSS REFERENCE TO RELATED APPLICATIONS

This application claims benefit of the priority of U.S. Provisional Patent Application No. 63/617,469 filed Jan. 4, 2024, entitled ANALYTICAL STORAGE, and the priority of U.S. Provisional Patent Application No. 63/598,694 filed Nov. 14, 2023, entitled IN-STORAGE DATA PROCESSING.

BACKGROUND

Analytical storage systems and devices are configured to allow analytical data processing to be performed closer to the data, providing potential benefits, such as reduced data movement over a network, reduced latency, accelerated data analysis, and so on. Such storage systems and devices include embedded processing units or circuitry, dedicated ASICs, and/or FPGAs, which enable execution of analytical data operations "near-storage" (or "near-memory"). In response to receipt of a command or query from a host computer, an analytical storage system or device executes one or more analytical operations on stored data, and provides results of the analytical operations to the host computer without providing or transferring the stored data itself, which is typically significantly larger than the results of the analytical operations. Similar concepts of performing data processing closer to the data are employed in computational storage systems and devices, which have built-in data processing and compute capabilities.

SUMMARY

Unfortunately, prior attempts at providing effective analytical storage systems and devices have encountered challenges. For example, integrating analytical data processing capabilities into such storage systems and devices can increase technological complexities in terms of programmability, hardware design, system compatibility, and system integration, as well as increase software and hardware development costs. Further, commands or queries for performing analytical data operations on such storage systems and devices can have formats difficult for host applications to use. In addition, performing analytical processing of data "near-storage" (or "near-memory") can lead to layer violations, in which one software layer component ends up affecting or interacting with another software layer component in a manner inconsistent with a storage system or device's architectural design and/or layering principles. If such a storage system or device and a host application both need to interpret a format of data being processed, then any revision of that data format would have to be supported by both the device layer and the host layer. Integrating analytical data processing capabilities into such storage systems and devices can increase other complexities as well, limiting widespread adoption of analytical storage technology.

Techniques are disclosed herein for executing analytical data operations "near-storage" (or "near-memory") with reduced technological complexity and simplified programmability. In the disclosed techniques, an analytical storage system or device can receive a first command issued by a host computer. The first command can define filter criteria and at least one address (e.g., logical block address (LBA)) range of data stored on the analytical storage system or device. The data can be stored on the analytical storage system or device in a flat dimensional (e.g., two (2)-dimensional) or multidimensional data array format. In one embodiment, a data array can implement column-oriented storage, in which data is stored column-by-column, and each data element in a respective column has a specified type and size. Further, each address range can be specified in the first command by a starting address (e.g., LBA) of a first data element of a respective column, and a length (e.g., in logical blocks) from the address of the first data element to an address (e.g., LBA) of a second (or last) data element of the respective column. The address range can be a contiguous range of addresses (e.g., LBAs) or a disjoint range of addresses (e.g., LBAs). The first command can operate on one or more selected columns of the data array. The disclosed techniques can include, upon receipt of the first command, determining and identifying which data elements of each selected column of the data array within a specified address range satisfy or match the defined filter criteria. The disclosed techniques can include providing (or making available or accessible), to the host computer (or human user), a count of the identified data elements, and/or a bitmap (or array) containing binary (e.g., single bit) values indicating locations of the identified data elements in the selected columns of the data array. In the disclosed techniques, the analytical storage system or device can receive a second command issued by the host computer. The second command can include a representation of the bitmap (or array). The disclosed techniques can include, upon receipt of the second command, providing (or making available or accessible), to the host computer (or human user), the identified data elements from the column locations indicated by the binary values contained in the bitmap (or array). By identifying data elements of selected columns of a data array that satisfy or match defined filter criteria, and providing a count of the identified data elements and/or a bitmap (or array) indicating locations of the identified data elements in the selected columns of the data array, the disclosed techniques can significantly reduce, in a single pass, a total amount of information or data to be provided (or made available or accessible) to a host computer (or human user). The disclosed techniques can be implemented, with reduced technological complexity and simplified programmability, in analytical storage systems and devices, computational storage systems and devices, SQL (Structured Query Language) database systems and devices, controllers external to the storage/database systems and devices, and/or any other suitable computerized storage/database systems, devices, or controllers capable of performing data processing "near-storage" (or "near-memory").

In certain embodiments, a method includes receiving, at a computerized storage device, a first command from a host computer. The first command defines filter criteria, and one or more address ranges of a data array. The method includes identifying, by the computerized storage device, one or more data elements that match the filter criteria within the one or more address ranges of the data array, and providing, by the computerized storage device, information pertaining to the identified data elements for use by the host computer.

In certain arrangements, the method includes providing a count of the identified data elements that match the filter criteria.

In certain arrangements, the method includes providing one or more bitmaps indicating locations of the identified data elements that match the filter criteria. Each location is indicated in the respective bitmaps by a single bit.

In certain arrangements, the method includes performing arithmetic operations on data contained in two or more fields of the respective bitmaps.

In certain arrangements, the method includes receiving, at the computerized storage device, a second command from the host computer. The second command includes at least one bitmap from among the one or more bitmaps. The method includes providing, by the computerized storage device, the identified data elements from the locations indicated by the bitmap for use by the host computer.

In certain arrangements, the method includes accessing, by the computerized storage device, the identified data elements from respective fields of the data array, and sending, by the computerized storage device, the identified data elements themselves to the host computer.

In certain arrangements, the method includes accessing the identified data elements from two or more respective fields of the data array. The two or more respective fields have different field sizes.

In certain arrangements, the method includes identifying two or more data elements of the data array that match the filter criteria within two or more contiguous address ranges of the data array.

In certain arrangements, the method includes identifying two or more data elements of the data array that match the filter criteria within two or more disjoint address ranges of the data array.

In certain arrangements, the method includes identifying, concurrently in parallel, two or more data elements of the data array that match the filter criteria within two or more address ranges of the data array.

In certain embodiments, a method includes receiving, at a computerized storage device, a first command from a host computer. The first command defines a bitmap indicating locations of one or more data elements of a data array. Each location of a respective data element of the data array is indicated by a single bit in the bitmap. The method includes providing, by the computerized storage device, the one or more data elements from the locations indicated by the bitmap for use by the host computer.

In certain arrangements, the method includes accessing, by the computerized storage device, two or more of the data elements of the data array from two or more contiguous address ranges of the data array.

In certain arrangements, the method includes accessing, by the computerized storage device, two or more of the data elements of the data array from two or more disjoint address ranges of the data array.

In certain arrangements, the method includes providing a count of the data elements for use by the host computer.

In certain embodiments, a system includes a memory, and processing circuitry configured to execute program instructions out of the memory to receive a first command from a host computer. The first command defines filter criteria, and one or more address ranges of a data array. The processing circuitry is configured to execute the program instructions out of the memory to identify one or more data elements that match the filter criteria within the one or more address ranges of the data array, and provide information pertaining to the identified data elements for use by the host computer.

In certain arrangements, the processing circuitry is configured to execute the program instructions out of the memory to provide a count of the identified data elements that match the filter criteria.

In certain arrangements, the processing circuitry is configured to execute the program instructions out of the memory to provide one or more bitmaps indicating locations of the identified data elements that match the filter criteria. Each location is indicated in the respective bitmaps by a single bit.

In certain arrangements, the processing circuitry is configured to execute the program instructions out of the memory to perform arithmetic operations on data contained in two or more fields of the respective bitmaps.

In certain arrangements, the processing circuitry is configured to execute the program instructions out of the memory to receive a second command from the host computer. The second command includes at least one bitmap from among the one or more bitmaps. The processing circuitry is configured to execute the program instructions out of the memory to provide the identified data elements from the locations indicated by the bitmap for use by the host computer.

In certain embodiments, a computer program product includes a set of non-transitory, computer-readable media having instructions that, when executed by processing circuitry, cause the processing circuitry to perform a method including receiving, at a computerized storage device, a first command from a host computer. The first command defines filter criteria, and one or more address ranges of a data array. The method includes identifying, by the computerized storage device, one or more data elements that match the filter criteria within the one or more address ranges of the data array, and providing, by the computerized storage device, information pertaining to the identified data elements for use by the host computer.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 2a is a diagram of an exemplary flat dimensional (e.g., two (2)-dimensional) data array format, which can be used to store user data of an analytical storage system or device in the operating environment of FIG. 1;

FIG. 2b is a diagram of an exemplary three (3)-dimensional data array format, which can be used to store user data of an analytical storage system or device in the operating environment of FIG. 1;

FIG. 2c is a diagram of an exemplary four (4)-dimensional data array format, which can be used to store user data of an analytical storage system or device in the operating environment of FIG. 1;

FIG. 3b is a block diagram of an exemplary data reduction, which can be obtained using the 2-dimensional data array format of FIG. 3a;

FIG. 4a is a block diagram of exemplary flash blocks, which can be used to store flash pages containing user data in a data array format;

FIG. 4b is a block diagram of exemplary flash pages, which can be stored in the flash blocks of FIG. 4a;

FIG. 4c is a block diagram of exemplary user data contained in the flash pages of FIG. 4b, exemplary data elements included in the user data, and an exemplary bitmap (or array) indicating locations of several of the data elements that satisfy or match defined filter criteria;

FIGS. 6a-6d are diagrams of exemplary user data in 2-dimensional data array formats, which are used to describe an illustrative example of the techniques, as disclosed herein.

DETAILED DESCRIPTION

Techniques are disclosed herein for providing analytical storage systems and devices capable of executing analytical data operations "near-storage" (or "near-memory"). The disclosed techniques can include receiving, at a computerized storage device, a command from a host computer, in which the command defines filter criteria, and one or more address ranges of a data array. The disclosed techniques can include identifying, by the computerized storage device, one or more data elements of the data array, in which the identified data elements satisfy or match the filter criteria within the one or more address ranges of the data array. The disclosed techniques can include providing (or making available or accessible), by the computerized storage device, information pertaining to the identified data elements for use by the host computer (or human user). The disclosed techniques can significantly reduce, in a single pass, a total amount of information to be provided (or made available or accessible) to a host computer (or human user) during execution of analytical data operations "near-storage" (or "near-memory"). The disclosed techniques can be implemented, with reduced technological complexity and simplified programmability, in analytical storage systems and devices, computational storage systems and devices, SQL (Structured Query Language) database systems and devices, controllers external to the storage/database systems and devices, and/or any other suitable computerized storage/database systems, devices, or controllers capable of performing data processing "near-storage" (or "near-memory").

Figure 1:
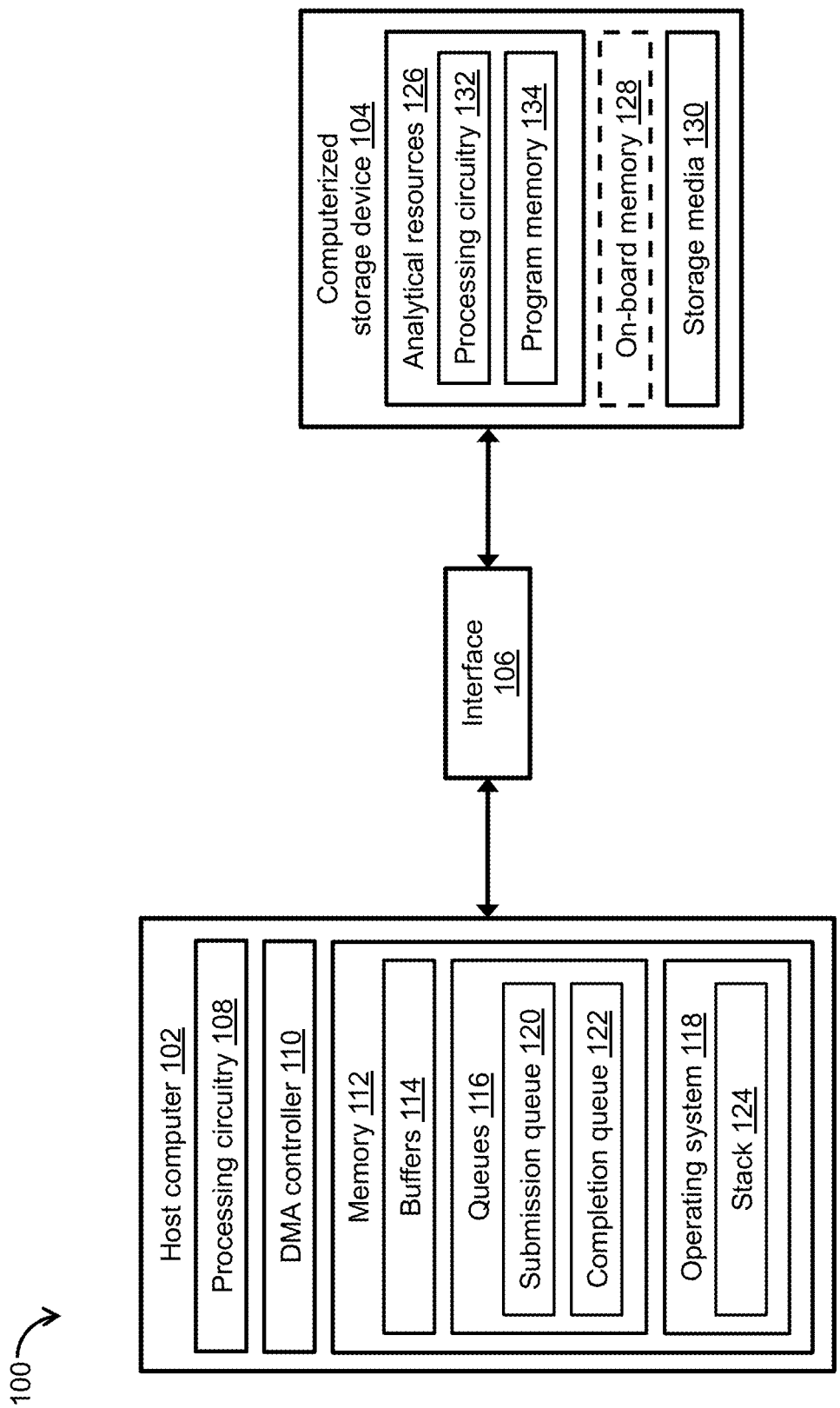
FIG. 1 is a block diagram of an exemplary operating environment, in which techniques can be practiced for executing analytical data operations "near-storage" (or "near-memory")

FIG. 1 depicts an illustrative embodiment of an exemplary operating environment 100, in which techniques can be practiced for executing analytical data operations "near-storage" (or "near-memory"). As shown in FIG. 1, the operating environment 100 can include a host computer 102, a computerized storage device 104, and an interface 106 communicably coupling the host computer 102 and the computerized storage device 104. For example, the computerized storage device 104 may be implemented as a Non-Volatile Memory express (NVMe) storage device, an SQL (Structured Query Language) database device, or any other suitable computerized storage or database device. Further, the interface 106 may include a Peripheral Component Interconnect express (PCIe) interface, Serial Advanced Technology Attachment (SATA) interface, Small Computer Systems Interface (SCSI), Ethernet interface, InfiniBand (IB) interface, Fiber Channel (FC) interface, and/or any other suitable interface. The interface 106 may also support the NVMe protocol, NVMe over Fabrics (NVMe-oF) protocol, Transmission Control Protocol/Internet Protocol (TCP/IP), Simple Service Discovery Protocol (SSDP), and/or any other suitable protocol. It is noted that the operating environment 100 of FIG. 1 is a non-limiting example for practicing the techniques disclosed herein, and that any other suitable operating environment may be used to practice and/or facilitate the disclosed techniques.

As shown in FIG. 1, the host computer 102 can include processing circuitry 108, a direct memory access (DMA) controller 110, and a memory 112. The processing circuitry 108 can include a central processing unit (CPU), a single core processor (e.g., CPU core), a multi-core processor (e.g., multiple CPU cores), and/or any other suitable processing circuitry, processing unit(s), and/or processor(s). The processing circuitry 108 can be configured to execute specialized code and/or applications as program instructions out of the memory 112 to carry out the techniques disclosed herein. The DMA controller 110 can be configured to enable the computerized storage device 104 to read data from, write data to, or otherwise access the memory 112 of the host computer 102. The memory 112 can include random access memory (RAM), read-only memory (ROM), flash memory, magnetic memory, solid-state memory, and/or any other suitable memory. The memory 112 can be configured to accommodate one or more input/output (IO) buffers 114 and queues 116, as well as an operating system (OS) 118, such as a Linux OS, Unix OS, Windows OS, or any other suitable operating system. The operating system 118 can include a software component stack (or "stack") 124, such as an NVMe stack, or any other suitable stack. The specialized code and/or applications executing on the host computer 102 can interact with the operating system 118, and use the stack 124 to read data from, or write data to, the computerized storage device 104. In one embodiment, the stack 124 can support NVMe commands to carry out the techniques disclosed herein. As such, the queues 116 can include a submission queue 120 and completion queue 122 pair for use in indicating submission and completion, respectively, of NVMe commands, which can make reference to data stored in the IO buffers 114 of the memory 112.

As shown in FIG. 1, the computerized storage device 104 can include analytical resources 126, an optional on-board memory 128, and storage media 130. The analytical resources 126 can include processing circuitry 132 and a program memory 134. The processing circuitry 132 can include a CPU, a single core processor (e.g., CPU core), a multi-core processor (e.g., multiple CPU cores), and/or any other suitable processing circuitry, processing unit(s), and/or processor(s). The program memory 134 can include RAM, ROM, flash memory, magnetic memory, solid-state memory, and/or any other suitable memory. In one embodiment, in response to an NVMe command issued by the host computer 102, the processing circuitry 132 can read a dataset from the storage media 130 into the program memory 134, identify data elements in the dataset that satisfy or match filter criteria defined by the NVMe command, and provide (or make available or accessible) information pertaining to the identified data elements for use by the host computer 102 (or human user). For example, such information, including indications of which data elements have been identified as satisfying or matching the filter criteria, may be provided to the host computer 102 over the interface 106. Alternatively, or in addition, information pertaining to the status of the NVMe command (e.g., command operation completed successfully/unsuccessfully) may be provided to the host computer 102 over the interface 106, and indications of the identified data elements may be written to an area of the on-board memory 128 accessible to the host computer 102.

The storage media 130 can include solid-state media (e.g., solid-state drives (SSDs)), magnetic media (e.g., hard disk drives (HDDs)), NVM media, and/or any other suitable storage media. In one embodiment, datasets stored on the storage media 130 can have a column-oriented format (e.g., Parquet format), multidimensional array-based data format (e.g., network Common Data Form (netCDF) format) (e.g., netCDF4), or any other suitable format.

In the context of the processing circuitry 108 or 132 being implemented by a CPU executing specialized code and/or applications as program instructions out of a memory, a computer program product can be configured to deliver all or a portion of the specialized code and/or applications to the CPU. Such a computer program product can include one or more non-transient computer-readable storage media, such as a magnetic disk, magnetic tape, compact disk (CD), digital versatile disk (DVD), optical disk, flash drive, SSD, secure digital (SD) chip or device, application specific integrated circuit (ASIC), field programmable gate array (FPGA), and so on. Further, the non-transient computer-readable storage media can be encoded with sets of program instructions for performing, when executed by the CPU, the various techniques and/or methods disclosed herein.

During operation, the computerized storage device 104 can execute analytical data operations "near-storage" (or "near-memory") with reduced technological complexity and simplified programmability. In one embodiment, the computerized storage device 104 can receive a first specialized command (also referred to herein as a "CHECK" command) issued by the host computer 102. In one embodiment, the specialized CHECK command can have a structure similar to that of an NVMe read command. The CHECK command can define filter criteria, and one or more address (e.g., logical block address (LBA)) ranges of data stored on the storage media 130 of the computerized storage device 104. In one embodiment, the data can be stored on the storage media 130 in a flat dimensional (e.g., two (2)-dimensional) or multidimensional data array format.

FIGS. 2a, 2b, and 2c depict representations of exemplary data array formats 202, 204, and 206, respectively, which can be used in practicing the techniques disclosed herein. It is noted that the data array formats 202, 204, 206 are provided for purposes of illustration only, and that any other suitable data array formats may be used to practice and/or facilitate the disclosed techniques. As shown in FIG. 2a, the data array format 202 can be used to define a "flat" dimensional data array in two (2) dimensions, X, Y. Such a 2-dimensional data array can implement storage for column-oriented data (e.g., Parquet data), in which the data is stored column-by-column, and each data element in a respective column can have the same size and type. Further, a CHECK command from the host computer 102 can specify LBA ranges by a starting LBA (and an offset 446 relative to the starting LBA; see FIG. 4c) of a first data element of a respective column of the 2-dimensional data array, and a length (e.g., in logical blocks) from the starting LBA (plus offset) of the first data element to an LBA of a second (or last) data element of the respective column of the 2-dimensional data array. The address range can be a contiguous range of addresses (e.g., LBAs), or a disjoint range of addresses (e.g., LBAs). As shown in FIG. 2b, the data array format 204 can be used to define a three (3)-dimensional data array along dimensions X, Y, Z. Further, as shown in FIG. 2c, the data array format 206 can be used to define a four (4)-dimensional data array along dimensions W, X, Y, Z. Such 3-dimensional, 4-dimensional, or higher dimensional data arrays can implement storage for multidimensional data (e.g., netCDF4 data), such as climate data or any other suitable multidimensional data.

Figure 3A:
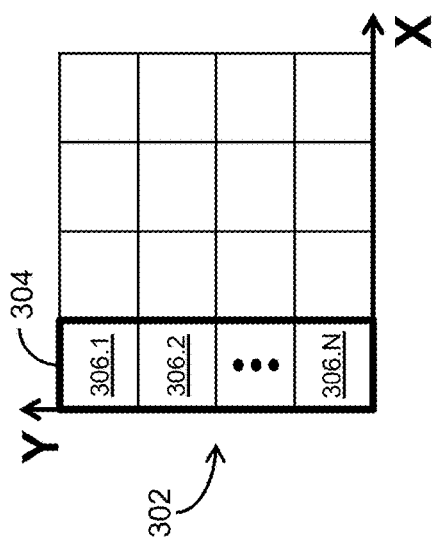
FIG. 3a is a diagram of an exemplary 2-dimensional data array format for implementing column-oriented storage.

As described herein, datasets stored on the storage media 130 of the computerized storage device 104 can have a column-oriented format (e.g., Parquet format). FIG. 3a depicts an exemplary 2-dimensional data array format 302 for implementing column-oriented storage. As shown in FIG. 3a, the data array format 302 can be used to define a flat dimensional data array in two (2) dimensions, X, Y. The flat (2)-dimensional data array of FIG. 3a can be used to store data in a plurality of columns, such as a column 304. It is noted that the data array format 302 can define any suitable number of columns along its X-dimension, as well as define any suitable number of rows along its Y-dimension. As shown in FIG. 3a, the column 304 of the 2-dimensional data array can store a plurality of data elements 306.1, 306.2, . . . , 306.N, each of which can contain one (1) byte, two (2) bytes, four (4) bytes, eight (8) bytes, sixteen (16) bytes, or any other suitable number of bytes of data.

Figure 3B:
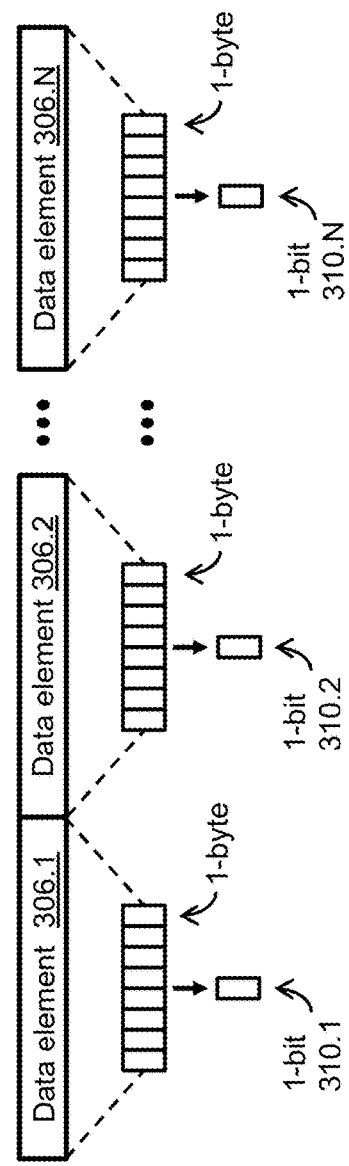

The CHECK command issued by the host computer 102 can operate on one or more selected columns of a data array, such as the column 304 of the 2-dimensional data array of FIG. 3a. Upon receipt of the CHECK command, the computerized storage device 104 can determine and identify which data elements of each selected column (e.g., the column 304) of the 2-dimensional data array, within a specified address range, satisfy or match the defined filter criteria. For example, the computerized storage device 104 may determine and identify at least the data elements 306.1, 306.2, 306.N of the column 304, within the specified address range, as satisfying or matching the defined filter criteria. Having determined and identified at least the data elements 306.1, 306.2, 306.N of the column 304, the computerized storage device 104 can provide (or make available or accessible), to the host computer 102 (or human user), a count (e.g., 3) of the identified data elements 306.1, 306.2, 306.N, and/or a bitmap (or array) containing binary (e.g., single bit) values indicating locations of the identified data elements 306.1, 306.2, 306.N in the column 304 of the 2-dimensional data array. For example, each of the data elements 306.1, 306.2, . . . , 306.N may contain 1-byte (eight (8)-bits) of data (see FIG. 3b). Further, each data element (e.g., data elements 306.1, 306.2, 306.N) that satisfies or matches the defined filter criteria can be represented in the bitmap (or array) by a single bit. As shown in FIG. 3b, the 1-byte (8-bit) data elements 306.1, 306.2, 306.N can be represented in the bitmap (or array) by single bits 310.1, 310.2, 310.N (see FIG. 3b), respectively. It is noted that the count of identified data elements, and/or the bitmap (or array) indicating locations of the identified data elements, may be stored in the on-board memory 128 or on the storage media 130 (e.g., on an SSD(s)), and made available or accessible to the host computer 102 (or human user) directly from the on-board memory 128 or the storage media 130.

During further operation, the computerized storage device 104 can receive a second specialized command (also referred to herein as a "FETCH" command) issued by the host computer 102. In one embodiment, the specialized FETCH command can have a structure similar to that of an NVMe write command. The FETCH command can include a representation of the bitmap (or array) previously provided to the host computer 102 in response to the CHECK command, or any other suitable bitmap (or array). Upon receipt of the FETCH command, the computerized storage device 104 can provide (or make available or accessible), to the host computer 102 (or human user), at least the identified data elements 306.1, 306.2, 306.N from the locations in the column 304, as indicated by the single bits 310.1, 310.2, 310.N contained in the bitmap (or array). By providing a count (e.g., 3) of at least the identified data elements 306.1, 306.2, 306.N, and/or a bitmap (or array) containing binary (e.g., single bit) values indicating locations of at least the data elements 306.1, 306.2, 306.N in the column 304 of the 2-dimensional data array, the computerized storage device 104 can significantly reduce, in a single pass, a total amount of information to be provided (or made available or accessible) to the host computer 102 (or human user), during execution of analytical data operations "near-storage" (or "near-memory").

As described herein, the storage media 130 of the computerized storage device 104 can include solid-state media, such as SSDs, which can store data using flash storage. In typical flash storage, a block (or "flash block") is the smallest storage unit that can be erased. Each flash block can contain a number of pages (or "flash pages"), which are the smallest storage units that can be written to. FIG. 4a depicts a plurality of flash blocks (e.g., flash blocks 421, 422), which can be contained in an SSD of the storage media 130. As shown in FIG. 4a, each flash block 421, 422 can contain a number of flash pages, such as flash pages 401, 402, . . . , 410 contained in the flash block 421, as well as flash pages 411, 412, . . . , 420 (see FIG. 4b) contained in the flash block 422. FIG. 4b depicts the flash pages 401, . . . , 410 that can be contained in the flash block 421, and the flash pages 411, . . . , 420 that can be contained in the flash block 422. Each flash page 401-420 can be used to store four (4) kilobytes (KB), eight (8) KB, or any other suitable amount of user data. For example, the flash page 401 may be used to store user data 448 (see FIG. 4c), the flash page 402 may be used to store user data 450 (see FIG. 4c), and so on, up to the flash page 410, which may be used to store user data 452 (see FIG. 4c). It is noted that each of the user data 448, the user data 450, and so on, up to the user data 452, can contain data in a 2-dimensional or other multidimensional data array format.

As further described herein, upon receipt of a CHECK command, the computerized storage device 104 can determine and identify which data elements of selected columns of a flat dimensional (or multidimensional) data array, within specified address ranges, satisfy or match defined filter criteria. In one embodiment, such determinations and identifications of data elements can be performed, by the computerized storage device 104, on user data stored on some or all of the flash pages 401-420 (see FIG. 4b) in a massively parallel manner. To that end, for example, a CHECK command from the host computer 102 may specify, by a Starting LBA_1 (plus offset) and Length (e.g., in logical blocks) (see FIG. 4c), a range of LBAs across the user data 448 of the flash page 401, the user data 450 of the flash page 402, and so on, up to user data 452 of the flash page 410. The CHECK command may specify the Length in terms of the LBA of the last data element in the last LBA range. Alternatively, the CHECK command may specify a count of the number of data elements for which the CHECK command is being processed. The computerized storage device 104 can perform the CHECK command to determine and identify data elements 424 contained in the respective user data 448, 450, . . . , 452, concurrently in parallel. Further, the computerized storage device 104 can provide (or make available or accessible), to the host computer 102 (or human user), a bitmap (or array) 426 (see FIG. 4c) containing single bit values 428, 430, 432, 434, 436, 438, and so on, indicating locations of the identified data elements in some or all of the user data 448, 450, . . . , 452 of the respective flash pages 401-410. Such determinations and identifications of data elements contained in user data of the flash pages 411-420 can be performed in a similar fashion.

It is noted that such determinations and identifications of data elements of a data array can be performed, concurrently in parallel, on user data stored on any suitable flash pages contained in any suitable flash blocks within any suitable contiguous or disjoint address ranges of an SSD. It is further noted that, although such flash pages are typically addressable at LBA boundaries, data array structures contained in user data stored on the flash pages may, or may not, be aligned to such address boundaries. For example, a data element 440 (see FIG. 4c) of a data array structure may be located across an LBA boundary 442 (see FIG. 4c). To account for this case, in its definition of an LBA range, a CHECK command can specify the offset 446 (see FIG. 4c) relative to a starting address (e.g., Starting LBA_1) of the LBA range, as well as an end point 444 (see FIG. 4c) relative to an ending address of the LBA range.

Figure 5:
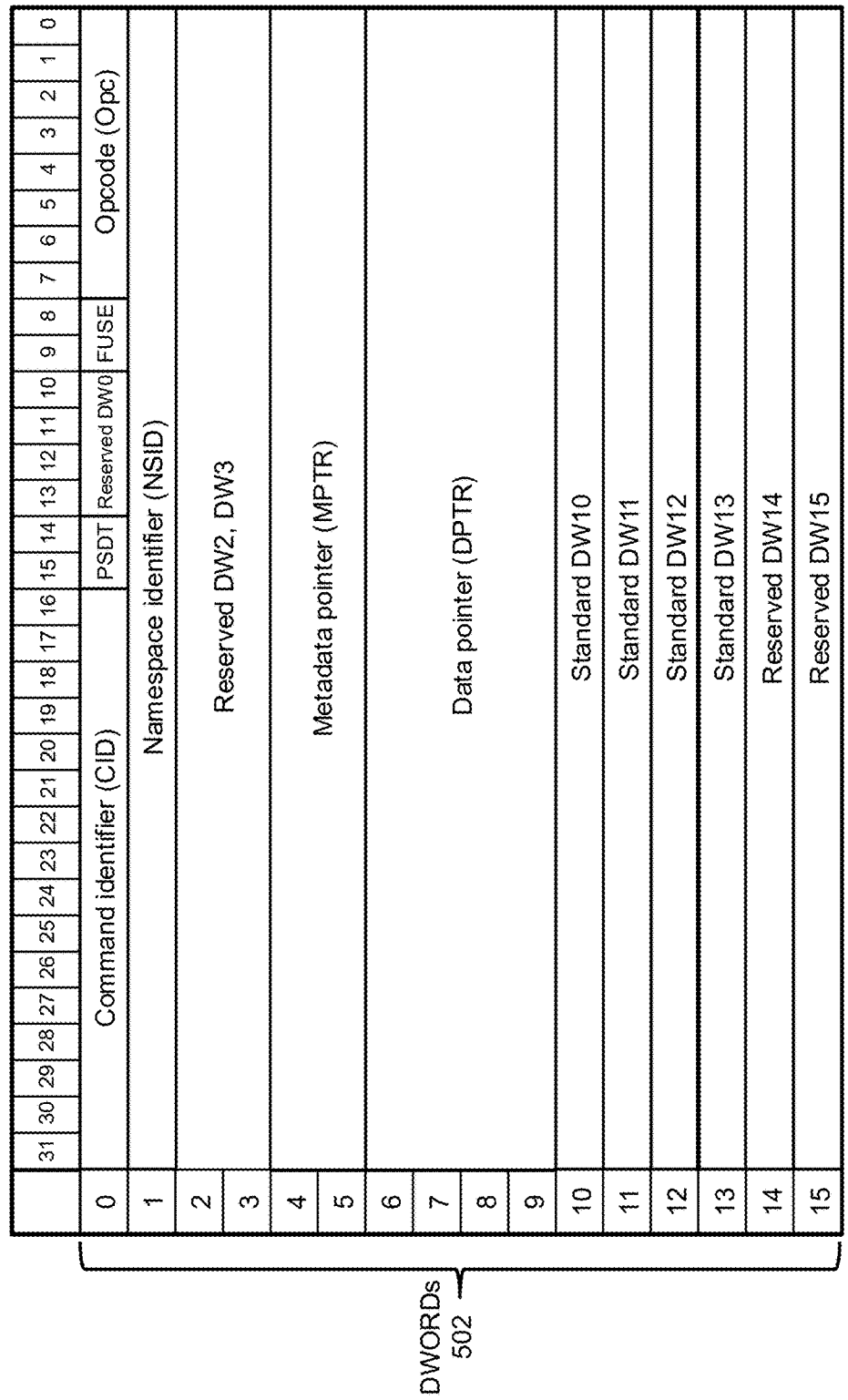
FIG. 5 is a diagram of an exemplary format of a Non-Volatile Memory express (NVMe) command, which can be used to implement the techniques, as disclosed herein.

FIG. 5 depicts a diagram of an exemplary format of an NVMe command 500, which can be used to implement specialized CHECK and FETCH commands, as described herein. As shown in FIG. 5, the format of the NVMe command 500 can include sixteen (16) DWORDs 0-15 (see reference numeral 502). The DWORD 0 can contain a Command identifier (CID) field, a PSDT (PRP or SGL for Data Transfer) field, a Reserved DW0 field, a FUSE (fused operation) field, and an Opcode (Opc) field. The CID field (bits 16-31) can be used to indicate a unique command ID. The PSDT field (bits 14, 15) can contain a flag indicating whether a PRP or SGL is to be used for data transmission related to the NVMe command 500. The FUSE field (bits 8, 9) can contain a flag indicating that at least a portion of the NVMe command 500 is a composite command formed by fusing two (2) other NVMe commands. The Opcode (Opc) field (bits 0-7) can be used to indicate whether the NVMe command 500 corresponds to an NVMe write command, NVMe read command, or any other suitable NVMe command. The DWORD 1 can contain a Namespace identifier (NSID) field (bits 0-31), which can be used to specify a namespace to which the NVMe command 500 command is to be applied. The DWORDs 2 and 3 can contain a Reserved DW2 field (bits 0-31), which can be used to indicate a size (e.g., in bytes) of an input or output buffer area, and an optional Query ID or Fetch ID. The DWORD 4 and 5 can contain a Metadata pointer (MPTR) field (bits 0-31), which can be used to specify an address of buffered metadata. The DWORDs 6-9 can contain a Data pointer (DPTR) field (bits 0-31), which can be used to address, on the host computer 102, the input buffer area for the NVMe command 500, as well as the output buffer area where a response to the NVMe command 500 can be stored. The DWORDs 10-13 can contain Standard DW10-DW13 fields (bits 0-31) for the NVMe command 500, and DWORDS 14 and 15 can contain Reserved DW14, DW15 fields (bits 0-31) for the NVMe command 500, as further described below.

As described herein, a CHECK command can define filter criteria, and one or more address (e.g., LBA) ranges of data stored on the storage media 130 of the computerized storage device 104. In one embodiment, the filter criteria can employ relational operators, such as =, >, <, ≠, ≥, and ≤, range operators, such as in-range(min, max) and out-of-range(min, max), and/or bitwise Boolean operators, such as AND, XOR, OR, NAND, and NOR. In one embodiment, the filter criteria can be applied to data elements of a data array, in which the data elements have a specified type and size. For example, the type of data elements may be specified as "integer" (signed, unsigned), and the size of the data elements may be specified as 1, 2, 4, 8, or any other suitable number of bytes. Alternatively, the type of data elements may be specified as "floating point", and the size of the data elements may be specified as IEEE Float64, IEEE Float32, IEEE Float16, BFloat16, or any other suitable size. It is noted that the relational and range operators of the filter criteria can be applied to floating point numbers using integer operations on their respective sign, exponent, and fraction components. As further described herein, a FETCH command can include a representation of a bitmap (or array) previously provided, by the computerized storage device 104, to the host computer 102 in response to a CHECK command. In one embodiment, such a FETCH command can define a starting LBA (plus offset) and length, and a size of data elements, as well as a representation of a bitmap (or array) indicating locations of data elements to be provided (or made available or accessible) to the host computer 102 (or human user) by the computerized storage device 104.

In one embodiment, a CHECK command can be constructed as a 2-step CHECK command, in accordance with the format of the NVMe command 500 (see FIG. 5). For example, a first command of the 2-step CHECK command may include, in the DPTR field (DWORDs 6-9), a number of submission queue command entries, namely, filter criteria defined by the relational operators (e.g., =, >, <, ≠, ≥, ≤), range operators (e.g., in-range(min, max), out-of-range(min, max)), and/or bitwise Boolean operators (e.g., AND, XOR, OR, NAND, NOR), arguments for the relational, range, and/or bitwise Boolean operators, and a type of data elements (e.g., integer, floating point). The first command of the 2-step CHECK command may also include, in the DPTR field (DWORDs 6-9), a completion queue command entry, namely, a Query ID. Further, a second command of the 2-step CHECK command may include a number of submission queue command entries, namely, a size (e.g., in bytes) of an output buffer area in the Reserved DW2 field (DWORD 2), the Query ID in the Reserved DW3 field (DWORD 3), a starting LBA in the Standard DW10, DW11 fields (DWORDs 10 and 11), the number of logical blocks (NLB) to be read in the Standard DW12 field (DWORD 12), an offset for the starting LBA in the Standard DW12 field (DWORD 12), a type of output (e.g., bitmap, array) in the Standard DW13 field (DWORD 13), and the number of data elements for the type of output in the Reserved DW14 field (DWORD 14). The second command of the 2-step CHECK command may also include, in the DPTR field (DWORDs 6-9), a number of completion queue command entries, namely, a count of data elements that satisfy or match the filter criteria, and a length or size (e.g., in bytes) of the output (e.g., bitmap, array). It is noted that the first command and the second command of the 2-step CHECK command can be fused, obviating the need to generate the Query ID.

In one embodiment, a FETCH command can likewise be constructed as a 2-step FETCH command, in accordance with the format of the NVMe command 500 (see FIG. 5). For example, a first command of the 2-step FETCH command may include a number of submission queue command entries, namely, a size (e.g., in bytes) of an input buffer area in the Reserved DW2 field (DWORD 2), and a type of data elements (e.g., integer, floating point) in the Reserved DW3 field (DWORD 3). The submission queue command entries may include the output (e.g., bitmap, array) resulting from previous application of the filter criteria in the DPTR field (DWORDs 6-9), the starting LBA in the Standard DW10, DW11 fields (DWORDs 10 and 11), the NLB to be read in the Standard DW12 field (DWORD 12), and the offset for the starting LBA in the Standard DW12 field (DWORD 12). The first command of the 2-step FETCH command may also include a completion queue command entry, namely, a Fetch ID in the DPTR field (DWORDs 6-9). Further, a second command of the 2-step FETCH command may include a number of submission queue command entries, namely, a size (e.g., in bytes) of an output buffer area in the Reserved DW2 field (DWORD 2), the Fetch ID in the Reserved DW3 field (DWORD 3), and retrieved data elements that satisfy or match the filter criteria, as indicated in the output (e.g., bitmap, array), in the DPTR field (DWORDs 6-9). The second command of the 2-step FETCH command may also include, in the DPTR field (DWORDs 6-9), a number of completion queue command entries, namely, a count of the retrieved data elements, and/or a total size of the retrieved data elements. It is noted that the first command and the second command of the 2-step FETCH command can be fused, obviating the need to generate the Fetch ID.

The disclosed techniques for providing analytical storage systems and devices capable of executing analytical data operations "near-storage" (or "near-memory") will be further understood with reference to the following illustrative example, and FIGS. 6a-6d. In this example, an exemplary dataset of interest is stored on the storage media 130 of the computerized storage device 104 in a column-oriented format (e.g., Parquet format). FIG. 6a depicts the dataset of interest stored in a flat dimensional (i.e., 2-dimensional) data array 600. As shown in FIG. 6a, the data array 600 includes user data relating to a manufactured product stored, column-by-column, under the following field headings: LINE NUMBER, CUSTOMER KEY 602, PART KEY 604, SUPPLY KEY 606, ORDER DATE 608, ORDER PRIORITY, QUANTITY 610, REVENUE 612, SUPPLY COST 614, and TAX.

In this example, a user wishes to determine, for a number of selected columns of the data array 600, which data elements in the selected columns satisfy or match defined filter criteria. For example, the selected columns may have the field headings, CUSTOMER KEY 602, PART KEY 604, SUPPLY KEY 606, ORDER DATE 608, REVENUE 612, and SUPPLY COST 614, and the filter criteria may be defined as the quantity of the manufactured product being between 11 and 20, and the order date of the manufactured product being Jan. 16, 2024 (20240116) or earlier. Such quantities and order dates are stored in the data array 600 under the field headings, QUANTITY 610 and ORDER DATE 608, respectively. FIG. 6b depicts, in bold outlines, the selected columns of the data array 600 under the field headings, CUSTOMER KEY 602, PART KEY 604, SUPPLY KEY 606, ORDER DATE 608, REVENUE 612, and SUPPLY COST 614.

In this example, the use of specialized CHECK and FETCH commands can be seen through the execution of an exemplary SQL (Structured Query Language) query on the user data stored in the data array 600. The SQL query can be expressed, as follows:

SELECT

CUSTOMER KEY (602),

PART KEY (604),

SUPPLY KEY (606),

ORDER DATE, (608)

REVENUE (612),

SUPPLY COST (614)

```
FROM
    DATA ARRAY (600)
WHERE
    (QUANTITY (610) BETWEEN 11 AND 20)
    AND (ORDER DATE (608)<=20240116);
```

It is noted that, in the SQL query above, the numbers, 600, 602, 604, 606, 608, 610, 612, 614 (each in parentheses), correspond to the reference numerals in FIGS. 6a-6c, and the number, 20240116, corresponds to the date, Jan. 16, 2024. It is further noted that all the numbers under the field heading, ORDER DATE 608 (see FIGS. 6a-6d) have the same date format. For example, the number, 20240101, corresponds to the date, Jan. 1, 2024, the number, 20240102, corresponds to the date, Jan. 2, 2024, the number, 20240103, corresponds to the date, Jan. 3, 2024, and so on. In addition, in the WHERE clause of the SQL query above, the subclause, (QUANTITY (610) BETWEEN 11 AND 20), corresponds to defined filter criteria of a first specialized CHECK command, and the subclause, (ORDER DATE (608)<=20240116), corresponds to defined filter criteria of a second specialized CHECK command.

To process the SQL query, the host computer 102 needs to determine and identify which data element(s) of each selected column (i.e., CUSTOMER KEY 602, PART KEY 604, SUPPLY KEY 606, REVENUE 612, SUPPLY COST 614) of the data array 600, within a specified address range, satisfy or match the defined filter criteria, where the corresponding QUANTITY is between 11 and 20, and the corresponding ORDER DATE is Jan. 16, 2024 (20240116) or earlier. To that end, the host computer 102 instructs the computerized storage device 104 to perform the first CHECK command on the column containing the QUANTITY 610 to determine and identify which data element(s) of the selected column, within a specified address range, satisfy or match the filter criteria of the corresponding QUANTITY being between 11 and 20. Having determined and identified the data elements in the selected column as satisfying or matching the filter criteria of the first CHECK command, the computerized storage device 104 provides, for the selected column, a first bitmap (or array) containing binary (e.g., single bit) values indicating locations of the identified data elements in the selected column (QUANTITY 610) of the data array 600. It is noted that the computerized storage device 104 is provided with the starting address, and information on how to evaluate whether data elements satisfy or match a specified CHECK operation. It is not necessary for the computerized storage device 104 to know the labels of the column.

In addition, the host computer 102 instructs the computerized storage device 104 to perform the second CHECK command on the selected column containing the order dates (ORDER DATE 608) to determine and identify which data element(s) of the selected column, within a specified address range, satisfy or match the filter criteria of the corresponding order date being Jan. 16, 2024 (20240116) or earlier. In this example, because the dates under the field heading, ORDER DATE 608, range from Jan. 1, 2024 (20240101) to Jan. 15, 2024 (20240115), all the data elements in each selected column are identified as satisfying the filter criteria of the second CHECK command. Having determined and identified all the data elements in the selected column as satisfying the filter criteria of the second CHECK command, the computerized storage device 104 provides a second bitmap (or array) containing binary (e.g., single bit) values indicating locations of all the data elements in the selected column. Further, the host computer 102 performs an intersection between the first bitmap and the second bitmap of the selected column. If the computerized storage device 104 is able to perform this operation, then the host computer 102 can instruct the computerized storage device 104 to perform this operation on its behalf. For example, the intersection of the first bitmap and the second bitmap can be performed as a Boolean AND operation. The result of the intersection between the first bitmap (or array) and the second bitmap (or array) is a bitmap (or array) containing binary (e.g., single bit) values indicating locations of the identified data elements that satisfy or match the filter criteria of both the first CHECK command and the second CHECK command. In this example, the CHECK operations, which are combined, are performed on separate columns of the data array 600. It is noted that some queries can perform multiple CHECK operations on a single column, e.g., to check if data elements are in multiple non-contiguous regions.

FIG. 6c depicts, in pattern fill for each selected column, the data elements identified as satisfying or matching the filter criteria of both the first CHECK command and the second CHECK command (i.e., where the corresponding QUANTITY is between 11 and 20, and the corresponding ORDER DATE is Jan. 16, 2024 (20240116) or earlier). The host computer 102 can obtain this information by requesting a FETCH operation for each column of interest, including the bitmap produced in the sequence above, along with the starting address and element size of each column being returned. As shown in FIG. 6c, in the selected column with the field heading, CUSTOMER KEY 602, the identified data elements have the values, 979, 235, and 617. Further, in the selected column with the field heading, PART KEY 604, the identified data elements have the values, 510, 70, and 552, and, in the selected column with the field heading, SUPPLY KEY 606, the identified data elements have the values, 942, 587, and 671. In addition, in the selected column with the field heading, REVENUE 612, the identified data elements have the values, 20748.27, 26818.47, and 30679.89, and, in the selected column with the field heading, SUPPLY COST 614, the identified data elements have the values, 3752.25, 3488.45, and 9079.92. FIG. 6c further depicts, in pattern fill, the data elements, 20240102, 20240104, and 20240115, in the selected column with the field heading, ORDER DATE 608.

As described herein, the computerized storage device 104 can significantly reduce, in a single pass, a total amount of information to be provided (or made available or accessible) to the host computer 102 (or human user), during execution of analytical data operations "near-storage" (or "near-memory"). To that end, the computerized storage device 104 can provide a count (e.g., 15) of the identified data elements in the selected columns (i.e., QUANTITY 610, ORDER DATE 608, or the combined result from both CHECK operations, as described above), which are identified as satisfying or matching the defined filter criteria. Alternatively, or in addition, the computerized storage device 104 can provide, for each selected column, the bitmap (or array) containing the binary (e.g., single bit) values indicating the locations of the identified data elements in the selected column. FIG. 6d depicts, as part of a reduced data array 622, the three (3) identified data elements of each selected column (i.e., CUSTOMER KEY 602, PART KEY 604, SUPPLY KEY 606, REVENUE 612, SUPPLY COST 614) and the corresponding order dates, as indicated in the column with the field heading, ORDER DATE 608.

Figure 7:
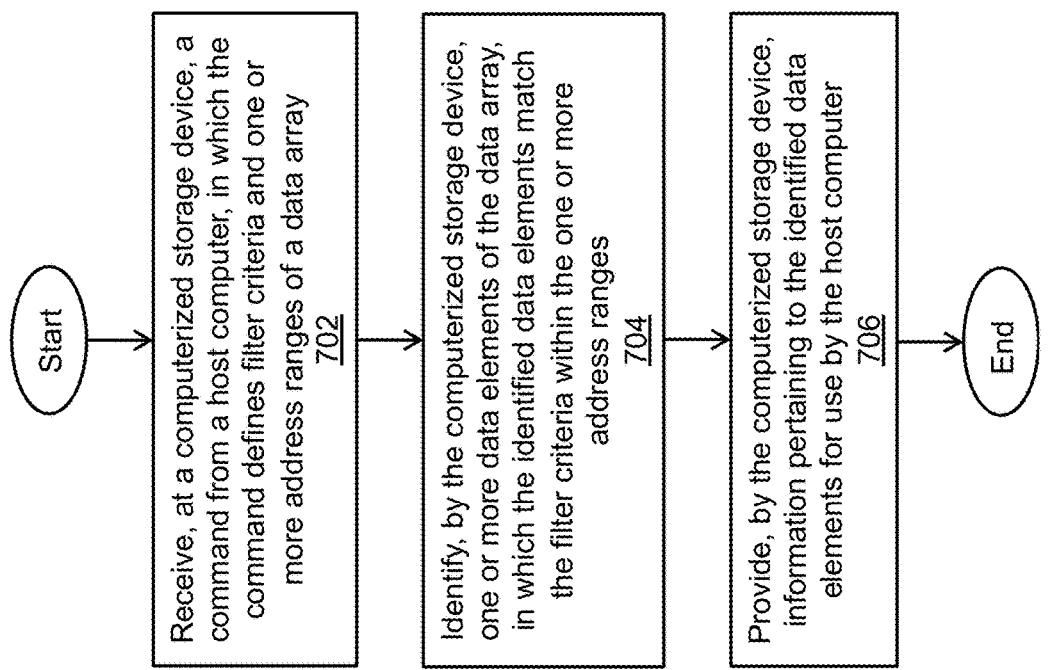
FIG. 7 is a flow diagram of an exemplary method of executing analytical data operations "near-storage" (or "near-memory") with reduced technological complexity and simplified programmability.

An exemplary method of executing analytical data operations "near-storage" (or "near-memory"), with reduced technological complexity and simplified programmability, is described below with reference to FIG. 7. As depicted in block 702, a command is received, at a computerized storage device, from a host computer, in which the command defines filter criteria and one or more address ranges of a data array. As depicted in block 704, one or more data elements of the data array are identified, by the computerized storage device, in which the identified data elements match the filter criteria within the one or more address ranges. As depicted in block 706, information pertaining to the identified data elements is provided, by the computerized storage device, for use by the host computer.

Having described the above illustrative embodiments, other alternative embodiments or variations can be made and/or practiced. For example, it was described herein that the computerized storage device 104 can include the optional on-board memory 128 (see FIG. 1). In one embodiment, upon receipt of one or more CHECK commands, the computerized storage device 104 can store intermediate bitmap (or array) results of the CHECK commands in the on-board memory 128. Further, the computerized storage device 104 can combine and/or manipulate the intermediate bitmap (or array) results, using arithmetic operators (e.g., +, −, *, ÷), Boolean operators (e.g., AND, XOR, OR, NAND, NOR), and/or any other suitable operators. In one embodiment, combining intermediate bitmap (or array) results using Boolean operators can make it possible to filter array datasets based on bit masking or byte masking. In one embodiment, one or more portions of address space mapped to the host computer 102 can reside in the on-board memory 128 of the computerized storage device 104. Such embodiments can facilitate performing analytical operations in-place, and concurrently, on one or more data arrays stored on the computerized storage device 104.

It was further described herein that a CHECK command can specify disjoint address (e.g., LBA) ranges for columns of a data array. Such disjoint LBA range sets can be generated using a modified Dataset Management (DSM) command, in accordance with the format of the NVMe command 500 (see FIG. 5). In one embodiment, the modified DSM command can include a number of submission queue command entries, namely, a Query ID in the Reserved DW3 field (DWORD 3), an input buffer area for the LBA range sets in the DPTR field (DWORDs 6-9), the number of LBA range sets in the Standard DW10 field (DWORD 10), an indication of an attribute type, "query read", in the Standard DW11 field (DWORD 11), an offset for a starting LBA in the Standard DW12 field (DWORD 12), and the number of data elements spanning all LBA range sets in the Reserved DW14 field (DWORD 14). The modified DSM command can further include a completion queue command entry, namely, a bitmap ID in the Reserved DW0 field (DWORD 0). In addition to the modified DSM command, a second command can be defined, in accordance with the format of the NVMe command 500 (see FIG. 5), to obtain a bitmap (or array) of data elements spanning all LBA range sets. In one embodiment, this second command can include a number of submission queue command entries, namely, a size (e.g., in bytes) of an output buffer area in the Reserved DW2 field (DWORD 2), the bitmap ID in the Reserved DW3 field (DWORD 3), and the output buffer area for the bitmap (or array) of data elements spanning all LBA range sets in the DPTR field (DWORDs 6-9). The second command can also include a completion queue command entry, namely, a length of the bitmap (or array) in the Reserved DW0 field (DWORD 0).

It was further described herein that a CHECK command issued by the host computer 102 can operate on selected columns of a data array, and, upon receipt of the CHECK command, the computerized storage device 104 can determine and identify which data elements of each selected column of the data array, within a specified address range, satisfy or match defined filter criteria. In one embodiment, the same CHECK command can operate on selected columns of multiple data arrays, which may be stored on the same solid-state media (e.g., the same SSD), or on separate SSDs of the storage media 130. In this embodiment, the computerized storage device 104 can determine and identify data elements of selected columns of multiple data arrays that satisfy or match the same defined filter criteria.

It was further described herein that, upon receipt of a FETCH command, the computerized storage device 104 can provide (or make available or accessible), to the host computer 102 (or human user), identified data elements of each selected column of a data array, as indicated by single bits contained in a bitmap (or array). In one embodiment, a FETCH command can specify a limit value, which places an upper limit on the total number of identified data elements to be provided (or made available or accessible) by the computerized storage device 104 to the host computer 102 (or human user).

It was further described herein that, in response to a command or query issued by the host computer 102, the processing circuitry 132 of the computerized storage device 104 can read a dataset from the storage media 130 into the program memory 134, identify data elements in the dataset that satisfy or match filter criteria defined by the command(s), and provide information pertaining to the identified data elements for use by the host computer 102 (or human user). In one embodiment, such a command or query from the host computer 102 can be received at a controller (or other computerized device) external to the storage device 104, which can be implemented as a JBOD (Just a Bunch Of Disks) enclosure service, or any other suitable enclosure service. In this embodiment, the external controller can include analytical resources for accessing an array dataset from the JBOD enclosure service, executing the command or query on the array dataset, and providing information resulting from the command/query execution for use by the host computer 102 (or human user).

It was further described herein that the computerized storage device 104 can receive a FETCH command issued by the host computer 102, in which the FETCH command can include a representation of a bitmap (or array) previously provided to the host computer 102 in response to a CHECK command. In one embodiment, such a FETCH command can be used and executed, in conjunction with a bitmap (or array), without having previously executed a CHECK command at the computerized storage device 104. It is noted that, whether executed alone or in combination, the CHECK command and the FETCH command can each result in information or data provided, or made available or accessible, to the host computer 102.

Several definitions of terms are provided below for the purpose of aiding the understanding of the foregoing description, as well as the claims set forth herein.

As employed herein, the terms "analytical storage system or device", "computational storage system or device", and "SQL database system or device" are intended to be broadly construed to encompass any computerized storage or database system or device suitable for performing the techniques and/or methods disclosed herein.

As employed herein, the terms "host" and "user" refer, interchangeably, to any human person, system, or other entity that uses a computerized storage system to store and/or manipulate data.

As employed herein, the term "storage media" or "storage device" refers to any non-volatile memory (NVM) device, including a hard disk drive (HDD), solid-state drive (SSD), flash drive (e.g., NAND flash drive, NOR flash drive), or similar storage media, device, or drive that may be accessed locally and/or remotely.

As employed herein, the term "storage entity" refers to a logical device, physical device, virtualized device, or similar storage entity.

As employed herein, the term "physical storage unit" refers to a physical entity, such as a storage drive or disk, or an array of storage drives or disks, for storing data in storage locations accessible at addresses.

As employed herein, the term "storage medium" refers to an SSD, HDD, or flash storage, a combination of SSDs, HDDs, and flash storage, a combination of SSDs, HDDs, flash storage, and other storage drives or devices, or any other suitable types and/or combinations of computer readable storage media.

As employed herein, the terms, "such as", "for example", "e.g.", "exemplary", and variants thereof refer to non-limiting embodiments, and have meanings serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optional" or "optionally" has a meaning that a feature, element, process, method, etc., may be provided in certain embodiments, and may not be provided in certain other embodiments. Any particular embodiment of the present disclosure may include a plurality of optional features, unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
   receiving, at a computerized storage device, a first command from a host computer, the first command defining filter criteria and one or more address ranges of a data array;
   identifying, by the computerized storage device, one or more data elements that match the filter criteria within the one or more address ranges of the data array; and
   providing, by the computerized storage device, information pertaining to the identified data elements for use by the host computer,
   wherein the providing of the information pertaining to the identified data elements includes providing one or more bitmaps indicating locations of the identified data elements that match the filter criteria, each location being indicated in the respective bitmaps by a single bit.

2. The method of claim 1 wherein providing the information pertaining to the identified data elements includes providing a count of the identified data elements that match the filter criteria.

3. The method of claim 1 comprising:
   performing arithmetic operations on data contained in two or more fields of the respective bitmaps.

4. The method of claim 1 comprising:
   receiving, at the computerized storage device, a second command from the host computer, the second command including at least one bitmap from among the one or more bitmaps; and
   providing, by the computerized storage device, the identified data elements from the locations indicated by the bitmap for use by the host computer.

5. The method of claim 1 comprising:
   accessing, by the computerized storage device, the identified data elements from respective fields of the data array,
   wherein providing the information pertaining to the identified data elements includes sending, by the computerized storage device, the identified data elements themselves to the host computer.

6. The method of claim 5 wherein accessing the identified data elements includes accessing the identified data elements from two or more respective fields of the data array, the two or more respective fields having different field sizes.

7. The method of claim 1 wherein identifying the one or more data elements includes identifying two or more data elements of the data array that match the filter criteria within two or more contiguous address ranges of the data array.

8. The method of claim 1 wherein identifying the one or more data elements includes identifying two or more data elements of the data array that match the filter criteria within two or more disjoint address ranges of the data array.

9. The method of claim 1 wherein identifying the one or more data elements includes identifying, concurrently in parallel, two or more data elements of the data array that match the filter criteria within two or more address ranges of the data array.

10. A method comprising:
    receiving, at a computerized storage device, a first command from a host computer, the first command defining a bitmap indicating locations of one or more data elements that match filter criteria within one, two, or more address ranges of a data array; and
    providing, by the computerized storage device, the one or more data elements from the locations indicated by the bitmap for use by the host computer, each location of a respective data element of the data array being indicated by a single bit in the bitmap.

11. The method of claim 10 wherein the one, two, or more address ranges include two or more contiguous address ranges of the data array, and wherein the method comprises:
    accessing, by the computerized storage device, two or more of the data elements of the data array from the two or more contiguous address ranges of the data array.

12. The method of claim 10 wherein the one, two, or more address ranges include two or more disjoint address ranges of the data array, and wherein the method comprises:
    accessing, by the computerized storage device, two or more of the data elements of the data array from the two or more disjoint address ranges of the data array.

13. The method of claim 10 comprising:
    providing a count of the data elements for use by the host computer.

14. A system comprising:
    a memory; and
    processing circuitry configured to execute program instructions out of the memory to:
    receive a first command from a host computer, the first command defining filter criteria and one or more address ranges of a data array;

identify one or more data elements that match the filter criteria within the one or more address ranges of the data array; and provide information pertaining to the identified data elements for use by the host computer, wherein providing the information pertaining to the identified data elements includes providing one or more bitmaps indicating locations of the identified data elements that match the filter criteria, each location being indicated in the respective bitmaps by a single bit.

15. The system of claim 14 wherein the processing circuitry is configured to execute the program instructions out of the memory to provide a count of the identified data elements that match the filter criteria.

16. The system of claim 14 wherein the processing circuitry is configured to execute the program instructions out of the memory to perform arithmetic operations on data contained in two or more fields of the respective bitmaps.

17. The system of claim 14 wherein the processing circuitry is configured to execute the program instructions out of the memory to receive a second command from the host computer, the second command including at least one bitmap from among the one or more bitmaps, and to provide the identified data elements from the locations indicated by the bitmap for use by the host computer.

18. A computer program product including a set of non-transitory, computer-readable media having instructions that, when executed by processing circuitry, cause the processing circuitry to perform a method comprising:

receiving, at a computerized storage device, a first command from a host computer, the first command defining filter criteria and one or more address ranges of a data array;

identifying, by the computerized storage device, one or more data elements that match the filter criteria within the one or more address ranges of the data array; and providing, by the computerized storage device, information pertaining to the identified data elements for use by the host computer, wherein the providing of the information pertaining to the identified data elements includes providing one or more bitmaps indicating locations of the identified data elements that match the filter criteria, each location being indicated in the respective bitmaps by a single bit.

* * * * *